(12) United States Patent
Yang et al.

(10) Patent No.: US 10,298,311 B2
(45) Date of Patent: May 21, 2019

(54) OVERHEAD REDUCTION FOR LINEAR COMBINATION CODEBOOK AND FEEDBACK MECHANISM IN MOBILE COMMUNICATIONS

(71) Applicant: MediaTek Inc., Hsinchu (TW)

(72) Inventors: Weidong Yang, San Diego, CA (US);
Lung-Sheng Tsai, Hsinchu (TW);
Chien-Yi Wang, Hsinchu (TW);
Chiao-Yao Chuang, Hsinchu (TW);
Kuhn-Chang Lin, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 15/969,747

(22) Filed: May 2, 2018

(65) Prior Publication Data

US 2018/0323854 A1  Nov. 8, 2018

Related U.S. Application Data

(63) Continuation-in-part of application No. 15/865,457, filed on Jan. 9, 2018.
(Continued)

(51) Int. Cl.
*H04B 7/06* (2006.01)
*H04B 7/0452* (2017.01)
(Continued)

(52) U.S. Cl.
CPC ......... *H04B 7/0658* (2013.01); *H04B 7/0417* (2013.01); *H04B 7/0452* (2013.01);
(Continued)

(58) Field of Classification Search
CPC .. H04B 7/0658; H04B 7/0626; H04B 7/0452; H04B 7/0417; H04L 25/021; H04L 25/0242
See application file for complete search history.

(56) References Cited

U.S. PATENT DOCUMENTS

2007/0211813 A1* 9/2007 Talwar ................. H04B 7/0417
375/267
2009/0016425 A1* 1/2009 Hui ........................ H04L 1/0019
375/240

(Continued)

FOREIGN PATENT DOCUMENTS

CN  102415002 A  4/2012
CN  106455091 A  2/2017

OTHER PUBLICATIONS

Penna et al. (Eigenvalue-based Signal Detection in Cognitive Femtocell Networks using a Decentralized Lanczos Algorithm, 2012, IEEE, p. 283).*
(Continued)

*Primary Examiner* — Kabir A Timory
(74) *Attorney, Agent, or Firm* — Han IP PLLC; Andy M. Han (57) ABSTRACT

Techniques and examples of overhead reduction for linear combination codebook and feedback mechanism in mobile communications are described. A user equipment (UE) receives from a base station of a network one or more reference signals via a communication link between the UE and the base station. The UE constructs a channel state information (CSI) feedback by utilizing a correlation of channel responses in a frequency domain to reduce feedback overhead. The UE then transmits the CSI feedback to the base station.

19 Claims, 3 Drawing Sheets

Related U.S. Application Data (60) Provisional application No. 62/492,977, filed on May 2, 2017, provisional application No. 62/501,139, filed on May 4, 2017.

(51) Int. Cl.
  *H04L 25/02* (2006.01)
  *H04B 7/0417* (2017.01)

(52) U.S. Cl.
  CPC ......... *H04B 7/0626* (2013.01); *H04L 25/021* (2013.01); *H04L 25/0242* (2013.01)

(56) References Cited

U.S. PATENT DOCUMENTS

| | | |
|---|---|---|
| 2011/0310870 A1 | 12/2011 | Van Nee et al. |
| 2012/0314613 A1 | 12/2012 | Zhang et al. |
| 2013/0010880 A1* | 1/2013 | Koivisto .............. H04B 7/0469 375/259 |
| 2013/0028182 A1 | 1/2013 | Geirhofer et al. |
| 2015/0171941 A1* | 6/2015 | Yokomakura .......... H04B 7/024 370/329 |
| 2017/0250787 A1* | 8/2017 | Geirhofer ............ H04B 7/0626 |
| 2017/0302353 A1* | 10/2017 | Rahman ............... H04B 7/0478 |
| 2017/0353267 A1 | 12/2017 | Kudekar et al. |

OTHER PUBLICATIONS

State Intellectual Property Office, International Search Report and Written Opinion for International Patent Application No. PCT/CN2018/085369, dated Jul. 23, 2018.
United States Patent and Trademark Office, Office Action for U.S. Appl. No. 15/865,457, dated Mar. 7, 2019.
Taiwan Intellectual Property Office, Office Action for Taiwan Patent Application No. 107115151, dated Feb. 27, 2019.

* cited by examiner

FIG. 2

TRANSMIT, BY A PROCESSOR OF A BASE STATION OF A NETWORK TO A USER EQUIPMENT (UE), ONE OR MORE REFERENCE SIGNALS VIA A COMMUNICATION LINK BETWEEN THE UE AND THE BASE STATION
310

RECEIVE, BY THE PROCESSOR FROM THE UE, A CHANNEL STATE INFORMATION (CSI) FEEDBACK WHICH IS CONSTRUCTED BY UTILIZING A CORRELATION OF CHANNEL RESPONSES IN A FREQUENCY DOMAIN, WITH THE CORRELATION INVOLVING A DETERMINATION OF A CHANNEL COVARIANCE MATRIX AND AN APPROXIMATION OF THE CHANNEL COVARIANCE MATRIX WITH A UNITARY BASIS
320

FIG. 3

OVERHEAD REDUCTION FOR LINEAR COMBINATION CODEBOOK AND FEEDBACK MECHANISM IN MOBILE COMMUNICATIONS

CROSS REFERENCE TO RELATED PATENT APPLICATION

The present disclosure claims the priority benefit of U.S. Provisional Patent Application No. 62/492,977, filed on 2 May 2017, as well as U.S. Provisional Patent Application No. 62/501,139, filed on 4 May 2017, and is part of a continuation-in-part (CIP) application claiming the priority benefit of U.S. Utility patent application Ser. No. 15/865,457, filed on 9 Jan. 2018. Contents of the aforementioned applications are herein incorporated by reference in their entirety.

TECHNICAL FIELD

The present disclosure is generally related to mobile communications and, more particularly, to overhead reduction for linear combination codebook and feedback mechanism in mobile communications.

BACKGROUND

Unless otherwise indicated herein, approaches described in this section are not prior art to the claims listed below and are not admitted as prior art by inclusion in this section.

In $5^{th}$ Generation (5G) New Radio (NR) networks, two types of channel state information (CSI) feedback schemes, Type I and Type II, have been defined. In Type I of CSI feedback, the conventional dual codebook structure is enforced. Type II of CSI feedback targets high-resolution CSI acquisition for multi-user multiple-input-and-multiple-output (MU-MIMO) operations. A linear combination codebook is assumed for Type II CSI feedback. There are three categories under Type II, namely Category I, Category II and Category III. With Category I, a linear combination (LC) codebook is assumed.

With Category II of Type II of CSI feedback, channel covariance matrix R measured at a user equipment (UE) is fed back from that UE to the network to facilitate MU-MIMO transmission. For effective MU-MIMO transmission with small cross-talk, typically subband feedback is necessary. Hence, subband feedback with the covariance matrix may be necessary.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of a UE receiving from a base station of a network one or more reference signals via a communication link between the UE and the base station. The method may also involve the processor constructing a channel state information (CSI) feedback by utilizing a correlation of channel responses in a frequency domain to reduce feedback overhead. The method may further involve the processor transmitting the CSI feedback to the base station.

In one aspect, a method may involve a processor of a base station of a network transmitting to a UE one or more reference signals via a communication link between the UE and the base station. The method may also involve the processor receiving from the UE a CSI feedback which is constructed by utilizing a correlation of channel responses in a frequency domain.

It is noteworthy that, although description provided herein may be in the context of certain radio access technologies, networks and network topologies such as Long-Term Evolution (LTE), LTE-Advanced, LTE-Advanced Pro, $5^{th}$ Generation (5G), New Radio (NR) and Internet-of-Things (IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

The following is a review on Type I codebook constructions and Type II Category I constructions for NR networks.

For NR, Type I for single-panel case with two-stage codebook-based precoding matrix indicator (PMI) feedback, $B_1$ in $W_1$, consists of a set of L Discrete Fourier Transform (DFT) beams. From RAN1 Ad Hoc (January 2017) and RAN1 88, for $W_1$ there are five alternatives (Alt. 1, Alt. 2, Alt. 3, Alt. 4 and Alt. 5), as listed below.

The first alternative for $W_1$, Alt. 1, is expressed mathematically as shown below.

$$W_1 = \begin{bmatrix} B_1 & B_2 \\ B_1 & -B_2 \end{bmatrix}, B_i = [b_0^j, \ldots, b_{L-1}^j];$$

The second alternative for $W_1$, Alt. 2, is expressed mathematically as shown below.

$$W_1 = \begin{bmatrix} B_1 & B_1 \\ B_2 & -B_2 \end{bmatrix}, B_i = [b_0^j, \ldots, b_{L-1}^j];$$

The third alternative for $W_1$, Alt. 3, is expressed mathematically as shown below.

$$W_1 = \begin{bmatrix} B & 0 \\ 0 & B \end{bmatrix}, B = [b_0, \ldots, b_{L-1}];$$

The fourth alternative for $W_1$, Alt. 4, is expressed mathematically as shown below.

$$W_1 = \begin{bmatrix} B & & & \\ & B & & \\ & & B & \\ & & & B \end{bmatrix}, B = [b_0, \ldots, b_{L-1}]; B \text{ as in Alt. 3}$$

The fifth alternative for $W_1$, Alt. 5, is expressed mathematically as shown below.

$$W_1 = \begin{bmatrix} B_1 & \\ & B_2 \end{bmatrix}, B_i = [b_0^j, \ldots, b_{L-1}^j];$$

For rank 1 and rank 2, L=1,2,4 and/or 7, although other values are not precluded. When L=1 (if supported), then $$W_1 = \begin{bmatrix} v & 0 \\ 0 & v \end{bmatrix}.$$

For $W_2$, the design candidates include Alt. 1, Alt. 2, Alt. 3 and Alt. 4. With respect to Alt. 1 for $W_2$, it is primarily for co-phasing with beam selected wideband in $W_1$. With respect to Alt. 2 for $W_2$, the basis combination coefficient is based on L basis based $W_1$, and this is similar to linear combination codebook. With respect to Alt. 3 for $W_2$, beam selection and co-phasing are from L-beam based $W_1$. With respect to Alt. 4 for $W_2$, it is LTE Class B type like CSI feedback (e.g., based on port selection/combination codebook), with $W_1$ and $W_2$ derived from different sets of CSI-RS resources (e.g., hybrid CSI).

For Type II Category I constructions, there are several schemes, namely scheme 1-1, scheme 1-2, scheme 1-3 and scheme 1-4.

Scheme 1-1 can be expressed mathematically as shown below.

$$W_1 = \begin{bmatrix} B & 0 \\ 0 & B \end{bmatrix},$$

$$B = \begin{bmatrix} b_{k_1^{(0)}, k_2^{(0)}} & \cdots & b_{k_1^{(L-1)}, k_2^{(L-1)}} \end{bmatrix}, B^H B = I$$

Here, $b_{k_1, k_2}$ is a two-dimensional (2D) DFT beam, where:

$k_1 = O_1 n_1 + q_1$, $0 \le n_1 \le N_1 - 1$, $0 \le q_1 \le O_1 - 1$ $k_2 = O_2 n_2 + q_2$, $0 \le n_2 \le N_2 - 1$, $0 \le q_2 \le O_2 - 1$

Also, $2N_1 N_2$ is the number of CSI-RS ports.

$$W = \begin{bmatrix} B & 0 \\ 0 & B \end{bmatrix} \times \text{diag}\left( \begin{bmatrix} \begin{bmatrix} P_{0,0,0} & & & \\ & P_{0,0,1} & & \\ & & \ddots & \\ & & & P_{0,0,L-1} \end{bmatrix} \begin{bmatrix} c_{0,0,0} \\ c_{0,0,1} \\ \vdots \\ c_{0,0,L-1} \end{bmatrix}, \begin{bmatrix} P_{0,1,0} & & & \\ & P_{0,1,1} & & \\ & & \ddots & \\ & & & P_{0,1,L-1} \end{bmatrix} \begin{bmatrix} c_{0,1,0} \\ c_{0,1,1} \\ \vdots \\ c_{0,1,L-1} \end{bmatrix}, \\ \begin{bmatrix} P_{1,0,0} & & & \\ & P_{1,0,1} & & \\ & & \ddots & \\ & & & P_{1,0,L-1} \end{bmatrix} \begin{bmatrix} c_{1,0,0} \\ c_{1,0,1} \\ \vdots \\ c_{1,0,L-1} \end{bmatrix}, \begin{bmatrix} P_{1,1,0} & & & \\ & P_{1,1,1} & & \\ & & \ddots & \\ & & & P_{1,1,L-1} \end{bmatrix} \begin{bmatrix} c_{1,1,0} \\ c_{1,1,1} \\ \vdots \\ c_{1,1,L-1} \end{bmatrix} \end{bmatrix} \right)$$

Here, $P_{r,l_1,l_2}$, r=0,1 is for polarization, $0 \le l_1 \le 1$ is for spatial layer, $0 \le l_2 \le L-1$, and L is the number of basis vector per polarization. Moreover, $c_{r,l_1,l_2}$ is for polarization r, $0 \le r \le 1$, $0 \le l_1 \le 1$ for spatial layers 1-2, $0 \le l_2 \le L-1$. Two designs are considered for $0 \le P_{r,l,i} \le 1$: (1) common amplitude for layers: $P_{r,0,i} = P_{r,1,i}$, and (2) common amplitude for polarizations: $P_{0,l,i} = P_{1,l,i}$. Here, $$c_{r,l,i} = \exp\left(\frac{2\pi n}{2^N}\right),$$

$\forall r,l,i; N \in \{2,3,4\}$.

Scheme 1-2 is similar to the design in Type I Alt. 4.

For scheme 1-3, $W_1$ consists of orthogonal DFT beams. In the expression below there is no requirement on orthogonality between $B_1$ and $B_2$.

$$W_1 = \begin{bmatrix} B_1 & B_2 \\ B_1 & -B_2 \end{bmatrix}, B_i^H b_i = I,$$

$$W^l = W_1 \underbrace{W_2^l}_{2L \times 2}, W_2^l = \begin{bmatrix} c_{l,0} \\ \vdots \\ c_{l,2L-1} \end{bmatrix}, l = 0, 1, , 2, \ldots.$$

Here, $$c_{l,0} = 1, c_{l,i} = P_i \exp\left(\frac{2\pi n}{N_i}\right), \forall l; N_i, P_i \in \{FFS\}.$$

$$W_1 = \begin{bmatrix} B_1 & B_2 \\ B_1 & -B_2 \end{bmatrix} = \begin{bmatrix} B_1 & B_2 & 0 & 0 \\ 0 & 0 & B_1 & B_2 \end{bmatrix} \begin{bmatrix} I & 0 \\ 0 & I \\ I & 0 \\ 0 & -I \end{bmatrix}$$

One observation can be made is that scheme 1-3 of Type II Category I is equivalent to scheme 1-1.

For scheme 1-4, $W_1$ consists of non-orthogonal beams.

$$W_1 = \begin{bmatrix} B_1 & B_1 \\ B_2 & -B_2 \end{bmatrix}, B_i = [b_0^i, \ldots, b_{L-1}^i]$$

Here, $b_j^i$ is a 2D DFT beam and $b_j^2 = \phi_j b_j^1$, where $\phi_j \in \{FFS\}$. From
From $$W_1 = \begin{bmatrix} B_1 & B_1 \\ B_2 & -B_2 \end{bmatrix} = \begin{bmatrix} B_1 & \\ & B_2 \end{bmatrix} \begin{bmatrix} I & I \\ I & -I \end{bmatrix} \text{ with } \Phi = \text{diag}\{\phi_j\}.$$

Another observation can be made is that scheme 1-4 of Type II Category I is equivalent to Type I Alt. 5 design.

$$W_1 = \begin{bmatrix} B_1 & B_1 \\ B_2 & -B_2 \end{bmatrix} = \begin{bmatrix} B_1 & \\ & B_1 \end{bmatrix} \begin{bmatrix} I & I \\ \Phi & -\Phi \end{bmatrix}$$

An additional observation can be made is that scheme 1-4 of Type II Category I is also equivalent to Type II Category I scheme 1-1.

Overhead Reduction for Linear Combination Codebooks

Linear combination codebooks can provide CSI at higher resolution than that with Type I dual codebooks. Proposals have been provided for amplitude quantization for the linear combination codebooks, e.g., according to spatial layer or polarization. The motivation for such practice is overhead reduction. On the other hand, typically Type II is associated with heavy feedback overhead, which tends to limit its use in practice.

Under a proposed scheme for overhead reduction for linear combination codebooks in accordance with the present disclosure, a correlation of channel responses in the frequency domain may be utilized to reduce the feedback overhead of linear combination codebooks. From field measurements and mathematical models adopted in standardization bodies, it can be verified that channel responses at frequency tones or subbands are correlated. By assuming the same IV, for all subbands, it can be assumed that the same clusters/paths are responsible for the channel effect at different subbands. With different Iv, designs (e.g., Alternatives 1-4 for Type I's $W_2$), separate beam selection and/or beam combination are still possible at subbands. Of course, with the beam group under the same $W_1$, selecting different beams for diferent subbands may consititute a sudden change in the precoder characteriziation across subband boundary, which may be caused by a corresponding change in the channel characterisitics across subband boundary.

As LC targets MU-MIMO, subband feedback is expected. Under the proposed scheme, the precoder may be required to be a continuous or slowly changing function of frequency. Consequently, the linear combination coefficients, which may include amplitude $P_{r,J_1,J_2}$ and/or phase $C_{r,J_1,J_2}$, may also be a continuous or slowly changing function of frequency, where r=0,1 is for polarization (e.g., r=0 for polarization at 45 degrees, r=1 for polarization at −45 degrees), $0 \leq l_1 \leq L_1 - 1$ is for spatial layer, $L_1$ is the rank of the codeword, $0 \leq l_2 \leq L-1$, and L is the number of basis vectors per polarization. Under the proposed scheme, different interpolation functions with polynomials and/or sinusoids may be utilized to synthesize these linear combination coefficients.

In general, Type II category I feedback in accordance with a design under the proposed scheme may be formulated as shown below.

$$W = \underbrace{\begin{bmatrix} B & 0 \\ 0 & B \end{bmatrix} \begin{bmatrix} Q_0 & 0 \\ 0 & Q_1 \end{bmatrix}}_{W_1}$$

$$Q_0 = \begin{bmatrix} Q_{0,0,0} & \cdots & Q_{0,L_1-1,0} \\ Q_{0,0,1} & \cdots & Q_{0,L_1-1,1} \\ \vdots & \vdots & \vdots \\ Q_{0,0,L-1} & \cdots & Q_{0,L_1-1,L-1} \end{bmatrix}_{L \times L_1}$$

$$Q_1 = \begin{bmatrix} Q_{1,0,0} & \cdots & Q_{1,L_1-1,0} \\ Q_{1,0,1} & \cdots & Q_{1,L_1-1,1} \\ \vdots & \vdots & \vdots \\ Q_{1,0,L-1} & \cdots & Q_{1,L_1-1,L-1} \end{bmatrix}_{L \times L_1}$$

Here, $Q_{r,l_1,l_2}$ denotes LC coefficients for $\{r,l_1,l_2\}$, with r=0,1 for polarization (e.g., r=0 for polarization at 45 degrees, r=1 for polarization at −45 degrees), $0 \leq l_1 \leq L_1 - 1$ for spatial layer, $L_1$ being the rank of the codeword, $0 \leq l_2 \leq L-1$, and L being the number of basis vectors per polarization.

When the polynomial basis is used, a second-order polynomial model, $Q_{r,l_1,l_2}(f) \approx a_{(0,r,l_1,l_2)} + a_{(1,r,l_1,l_2)}f + a_{(2,r,l_1,l_2)}f^2$, with scalars $a_{(k,r,l_1,l_2)}$, $0 \leq k \leq 2$, may be an example to approximate $Q_{r,l_1,l_2}(f)$ over multiple frequency bands with the polynomial bases. When other bases are used (e.g., sine functions, spline functions or the like), corresponding coefficients may be used.

Accordingly, for each $\{r, l_1, l_2\}$, UE's feedback, $\{a_{(0,r,l_1,l_2)}, a_{(1,r,l_1,l_2)}, a_{(2,r,l_1,l_2)}\}$, may provide the amplitude and phase for linear combination in multiple frequency bands. Moreover, in cases where a single approximation (e.g., second-order polynomial with $\{a_{(0,r,l_1,l_2)}, a_{(1,r,l_1,l_2)}, a_{(2,r,l_1,l_2)}\}$) may not be valid or optimal for all frequency bands, then piece-wise approximations over multiple band sets may be used. For instance, a first set of $\{a_{(0,r,l_1,l_2)}, a_{(1,r,l_1,l_2)}, a_{(2,r,l_1,l_2)}\}$ may be used for frequency bands 1~10, and a second set of $\{a_{(0,r,l_1,l_2)}, a_{(1,r,l_1,l_2)}, a_{(2,r,l_1,l_2)}\}$ may be used for frequency bands 11~20.

In another example, $Q_{r,l_1,l_2}(f) = P_{r,l_1,l_2}(f) \times \exp(\sqrt{-1} A_{r,l_1,l_2}(f))$, and $C_{r,l_1,l_2}(f) = \exp(\sqrt{-1} A_{r,l_1,l_2}(f))$, with f denoting frequency, e.g., frequency band index. By the notation $P_{r,l_1,l_2}(f)$, the amplitude parts in the linear combination may be frequency-dependent, as they may be different for different frequency bands.

A method had been proposed during Rel-14 eFD-MIMO to reduce overhead by enforcing the same amplitude for different polarizations or spatial layers. Following this method, interpolation either for phase part of linear combination coefficients or for linear combination coefficients with constant amplitude in the frequency domain may bring further overhead reduction. Moreover, interpolation of the co-phasing terms $C_{r,l_1,l_2}(f)$ may be performed in the angular domain (e.g., assuming $A_{r,l_1,l_2}(f)$ can be approximated by a second-order polynomial or a higher-order polynomial with real coefficients). Alternatively, it may be assumed that $C_{r,l_1,l_2}(f)$ can be approximated, for example, with a second-order polynomial or a higher-order polynomial with complex coefficients.

Under the proposed scheme, correlation in the frequency domain may be utilized for some but not all parameters used in the determination of a codeword. Accordingly, interpolation in the frequency domain may be used for $P_{r,l_1,l_2}$, but not for $C_{r,l_1,l_2}$. Under the proposed scheme, in another approach that utilizes the correlation property along the frequency domain may be to consider differential feedback. Considering the linear combination coefficients, amplitude $P_{r,l_1,l_2}$, and/or phase $C_{r,l_1,l_2}$ should be a continuous function of frequency, the feedback may be quantization of a difference between the amplitudes/phases at two adjacent frequency bands, or a predefined step size for amplitude and/or phase. For example, for each frequency band, two bits may be used to indicate that the amplitude difference is 0, +1, −1 or +2.

Thus, under the proposed scheme, in a linear combination feedback, some or all coefficients may be expressed as functions of frequency over multiple frequency bands. Moreover, under the proposed scheme, a linear combination feedback may include a difference of coefficients between adjacent frequency bands such as, for example and without limitation, a difference in amplitude and/or phase between two adjacent frequency bands.

Feedback Mechanism for Cellular Communication

In NR, the number of downlink (DL) CSI reference signal (CSI-RS) ports, N, can be as high as 32. Hence, potentially feedback of channel covariance matrix at 32×32 is needed in the uplink (UL) transmission from a UE to the network. Properties of the covariance matrix can be exploited to reduce the feedback overhead. For example, as R is Hermitian, it is enough to feed back the diagonal elements and the lower or upper sub-triangular matrix, then $$N + \frac{(1 + (N-1)) \times (N-1)}{2} \times 2 = N^2$$

independent real scalars rather than $2N^2 - N$ real scalars are needed in the feedback.

In mobile communication systems such as a NR network, typically $N_R$ the number of DL receiving (Rx) antenna ports at a UE, is much less than N, the number of DL transmission (Tx) antenna ports at the base station of the NR network. For example, thirty-two CSI-RS ports may be used at a base station and two Rx antenna ports may be used at the UE. Hence, R is often rank-deficient at a given frequency in a noise-free reception. Yet due to factors such as thermal noise, interference from other base stations, and interference from other UEs as in dynamic time-division duplexing (TDD) scenarios, or due to accumulation over multiple frequencies/subbands, R is typically full-rank yet its eigenvalues can be grouped as $\lambda_1 \geq \lambda_2 \geq \ldots \geq \lambda_{N_s} \gg \lambda_{N_s+1} \geq \ldots \geq \lambda_N$, where $N_s$ is the spatial rank of the channel between the UE and the base station, with $N_s \leq N_{rx}$.

Under a proposed scheme for feedback mechanism in accordance with the present disclosure, there may be several alternatives (Alternative 1, Alternative 2 and Alternative 3) to an approximation with low-rank matrices to R. In Alternative 1, R may be expressed mathematically as $R \approx GG^H + \sigma^2 I$, where G is a N×L matrix and $\sigma^2$ is used to approximate eigenvalues of relatively small values, e.g., $\lambda_{N_s-1}, \ldots, \lambda_N$, $\sigma^2$ or in general a factor which accounts for the modeling error in the feedback can be useful at the network.

A factor (e.g., $\sigma^2$) related to feedback error/noise level such as $\|R - GG^H\|_1$, $\|R - GG^H\|_2$, $\|R - GG^H\|_4$ made available at the network side through UE feedback may be used to determine cross-talk leakage in a MU-MIMO scheduling as R, which is the covariance matrix estimate from UE feedback may be different from R. Hence, feedback with G and $\sigma^2$ may be enough to provide the network with an approximate version of R.

In choosing L, it may be necessary to trade-off between approximation accuracy and feedback overhead. Typically, approximation accuracy may be improved by increasing L. However, the feedback overhead would also increase as shown below. As the feedback overhead needs to be budgeted for the worst case (e.g., $N_s = N_{rx}$), one possibility is to assume $L = N_{rs}$, with the understanding that the rank of G can be less than $N_{rx}$. In some cases, $L > N_{rs}$ can be also used, for example, for the Lanczos method proposed below so that approximation accuracy may be maintained. In another approach, L may be determined by the UE according to the tradeoff between approximation accuracy and feedback overhead.

It is noteworthy that in contrast with other approaches, under the proposed scheme there is no requirement that an eigen decomposition of R in the approximation for each subband of interest, as eigen-decomposition can be rather expensive in terms of computational complexity.

Some variations to the basic formulation can also be considered. In a first variation, G can be written as the product of two matrices VC, where V is a N×L matrix, and C is a L×L matrix, as in $$R \approx \underbrace{(VC)}_{G}(VC)^H + \sigma^2 I,$$

which is Alternative 2 under the proposed scheme. In a second variation, V is a N×L matrix, and C is a L×L matrix, as Alternative 3 under the proposed scheme, which may be expressed mathematically as $R \approx VCV^H + \sigma^2 I$.

It may be assumed that, from aggregating over subband k, a subband channel covariance matrix $R^{(k)}$ is obtained at UE, and in total there are K subbands. Then, the wideband covariance matrix may be expressed mathematically as shown below.

$$R = \frac{\sum_{k=1}^{K} R^{(k)}}{K}$$

If a low-rank matrix V with orthogonal columns or non-orthogonal columns can be identified from R, and a low-rank matrix $C^{(k)}$ can be identified, so that $R^{(k)}=VC^{(k)}V^H+\sigma_k^2 I$, then it is enough to feed back V, $C^{(k)}$, $1 \le k \le K$ and $\sigma_k^2$, $1 \le k \le K$ which accounts for different interference plus noise levels at subbands.

There may be a number of options (Option 1, Option 2 and Option 3) to be considered. Under Option 1, the Cholesky decomposition on R may be performed so that $R \approx VV^H$. Then, $C^{(k)}=V^{\#}R^{(k)}(V^{\#})^H$, where $V^{\#}$ is the pseudo-inverse of V. In this case it is not required for R to have orthogonal columns.

Under Option 2, if V has orthogonal columns, $V=\bar{V} \times \text{diag}(P_1, P_2, \ldots, P_L)$, $\bar{V}$ has orthonormal columns, $P_i$ are positive scalars, then the following can be established:

$$C^{(k)} = \text{diag}(1/\sqrt{P_1}, 1/\sqrt{P_2}, \ldots, 1/\sqrt{P_L}) \times$$
$$V^H R^{(k)} V \times \text{diag}(1/\sqrt{P_1}, 1/\sqrt{P_2}, \ldots, 1/\sqrt{P_L})$$

Here, there are two sub-options (Option 2a and Option 2b). Under Option 2a, $\bar{V}$ consists of columns of DFT vectors, or the Kronecker product of DFT vectors as in the case with a 2D antenna array such as $W_1$ in NR CSI Type II Category I. In this case, the same $W_1$ design may be used for both Category I and Category II of Type II. Under Option 2b, $\bar{V}$ consists of columns of orthonormal vectors as generated from the Lanczos algorithm discussed below. For Options 2a and 2b, eigen decomposition on R is not performed.

Under Option 3, eigen decomposition on R is performed. Here, V consists of eigenvectors that are orthonormal and correspond to the largest L eigenvalues. Then, the following can be established: $C^{(k)}=V^{\#}R^{(k)}V$.

With the above-described options, as V is common for K subband(s), a feedback of V, $C^{(k)}$, $1 \le k \le K$ (may be enough information in the feedback from UE to the network for the network to reconstruct approximated versions of $R^{(k)}$. For each option, there may be specific techniques to reduce signaling overhead further. Yet, the common framework of feeding back V, $C^{(k)}$, $1 \le k \le K$ may allow different UE implementations. For instance, for a UE capable of performing eigen decomposition on R, V consists of eigenvectors from eigen composition. Conversely, for a less-capable UE, the Lanczos method may be utilized to generate V.

As the channel covariance matrix is not expected to make sudden changes across subbands, under the proposed scheme this characteristic may be exploited to further reduce feedback overhead. For example, by using a polynomial basis and the second-order polynomial (or a higher-order polynomial), the following equation may be obtained: $C^{(k)} \approx C_0+C_1 \times k+C_2 k^2$, with $C_0$, $C_1$ and $C_2$ being matrices of appropriate dimensions.

If K=10, originally ten matrices would need to be fed back, but with the proposed scheme the three matrices of $C_0$, $C_1$ and $C_2$ would be enough.

Under suitable conditions, $R \approx R^H \otimes R^V$, where $R^H$ is the covariance matrix due to horizontal ports at a base station, $R^V$ is the covariance matrix due to vertical ports at the base station, and $\otimes$ is the Kronecker product operator. Accordingly, it is possible to explore the so-called Kronecker structure of the covariance matrix, and the above procedure may be applied separately to $R^H$ and $R^V$.

The Lanczos method is a method in numerical linear algebra that has been used in deriving low-rank approximation to covariance matrix. For a given N×N Hermitian matrix R and a non-zero N-vector b, L steps of the variant of the Lanczos algorithm can be described as follows:

Initialize the algorithm with $\beta_1=\|b\|$ $v_1=b/\beta_1$ $u_1=Rv_1$ for j=1, 2, . . . , L repeat steps below:

$a_j=v_j^H u_j$ $w_j=u_j-a_j v_j$ $\beta_{j+1}=\|w_j\|$ if $\beta_{j+1}=0$, then STOP, else $v_{j-1}=w_j/\beta_{j-1}$ $u_{j+1}=Rv_{j+1}-\beta_{j+1}v_j$ This version of the Lanczos algorithm is referred to as the "scalar Lanczos algorithm" herein. By running the Lanczos algorithm on R and b, with $L=N_{rx}$ for example, a unitary basis $\{v_1,v_2,\ldots,v_L\}$ may be obtained. The linear span from $\{v_1,v_2,\ldots,v_L\}$ is close to the subspace spanned by the eigenvectors for $\lambda_1, \ldots, \lambda_L$. By assuming that $R \approx VCV^H$, once $V=[v_1\ v_2\ \ldots, v_L]$ is identified, C can be found from $V^H(R)V \approx V^H(VCV^H)V$, as $V^H RV \approx C$, where C is a tri-diagonal Hermitian matrix as it has non-negative scalars for diagonals. That is, only the diagonal elements, super-diagonal elements and sub-diagonal elements in C are non-zero. All the elements in C can be known from the Lanczos algorithm expressed mathematically below.

$$C = \begin{bmatrix} \alpha_1 & \beta_2 & & \\ \beta_2 & \alpha_2 & \cdot & \\ & \cdot & \cdot & \beta_L \\ & & \beta_L & \alpha_L \end{bmatrix}$$

It is noteworthy that there are also block Lanczos algorithms. With a block Lanczos algorithm, instead of starting a vector b, b is assumed to be a unitary matrix. The resulted $\{v_1,v_2,\ldots,v_L\}$ may have $v_j$ as matrix, $1 \le j \le L$. Similarly, with $V=[v_1\ v_2\ \ldots\ v_L]$, where $C=V^H RV$ is a block tri-diagonal Hermitian matrix. That is, only the diagonal blocks, super-diagonal blocks and sub-diagonal blocks in C are non-zero. In the original formulation of the Lanczos method and subsequent treatments on subspace decomposition, b is assumed to be randomly selected.

Under the proposed scheme, b may be selected from a codebook. For instance, with the scalar Lanczos algorithm, b may be chosen as a rank 1 codeword from a defined codebook (e.g., Type I dual-stage codebook or Type II Category I codebook in NR). In the case of using the Type I dual-stage codebook, $b=W_1W_2$, a set of indices $\{i_{1,1},i_{1,2},i_2\}$ for identifying $W_1$ and $W_2$ may be fed back to the network. Here, $i_{1,1}$ is the beam index for dimension 1, and $i_{1,2}$ is the beam index for dimension 2, with $i_2$ for beam selection, combination and/or co-phasing. Some examples of dual-stage codebooks may be found in Rel-10, Rel-11, Rel-12, Rel-13 and Rel-14 versions of 3GPP TS 36.213. The feedback overhead for the set of indices may be rather small compared with the overhead associated with the feedback of an arbitrary b. Assuming N=32, if an arbitrary b is used, then 2N real scalars are needed in the CSI reporting for b. Here, around 10 bits may be needed. In the case of using Type II Category I codebook, besides a beam group index, Z , a so-called linear combination matrix may be used to determine b as in b=$W_1$Z. As the overhead to signal the beam group index and the overhead to signal the coefficients of Z can be small compared to the overhead of feeding back an arbitrary b, feedback overhead reduction may be achieved with this method. With the block Lanczos algorithm, as b is a matrix rather than a vector, b can be chosen from codewords for rank >1 in a defined codebook. Similar to the scalar Lanczos algorithm, b can be chosen from a Type I codebook or a Type II Category I codebook. The overhead incurred in feeding back a set of indices for beam group identification, beam selection, beam combination, beam co-phasing and/or linear combination matrix may be much less than that by directly feeding back b .

In view of the above, under the proposed scheme for feedback mechanism in accordance with the present disclosure, a procedure for covariance matrix feedback may be utilized as a feedback mechanism to reduce feedback overhead. The procedure is described below.

At a first stage of the procedure, it may be assumed that, from aggregating over subband k, a subband channel covariance matrix $R^{(k)}$ may be obtained at a UE when there are K subbands total.

At a second stage of the procedure, a wideband covariance matrix may be given by the mathematical expression below.

$$R = \frac{\sum_{k=1}^{K} R^{(k)}}{K}$$

At a third stage of the procedure, a codeword b may be identified from or otherwise determined based on a given codebook (e.g., a NR Type I codebook). The identification/determination may be through a set of indices to beam group, beam selection, beam combination and/or co-phasing. Alternatively, the codeword b may be identified from or otherwise determined based on a codebook (e.g., a NR Type II linear combination codebook). The identification/determination may be through a linear combination matrix Z of reduced dimension as well as a set of indices to beam group, beam selection, beam combination and/or co-phasing. The codeword b may be of rank 1 or a higher rank.

At a fourth stage of the procedure, depending on the rank of b, the scalar Lanczos algorithm or the block Lanczos algorithm may be applied to R and b to generate $\{v_1, v_2, \ldots, v_L\}$, where L may be chosen considering feedback overhead and approximation accuracy. That is, a larger L may lead to a heavier overhead and a better approximation to R.

At a fifth stage of the procedure, let V=$[v_1, v_2, \ldots, v_L]$, $C^{(k)}=V^H R^{(k)} V$, $1 \leq k \leq K$. In general, $C^{(k)}$ thus obtained is no longer a (block) tri-diagonal matrix anymore. Here, the (block) tri-diagonal matrix structure may be enforced so that elements other than diagonal elements/blocks, super-diagonal elements/blocks and sub-diagonal elements/blocks may be set to zero.

At a sixth stage of the procedure, a UE may feed back to a base station the set of indices and/or matrix z for the base station to determine b and $v_2, \ldots, v_L$. It is noteworthy that $v_1$ may be trivially derived from b . For frequency band $1 \leq k \leq K$, the UE feeds back $C^{(k)}$. Interpolation in the frequency domain may be applied to $C^{(k)}$ to further reduce feedback overhead.

It is noteworthy that, in implementing the above-described procedure, various adjustments to the computation steps in the Lanczos algorithm, as well as various modifications to the Lanczos algorithm, may be made. For example, the first vector in the Lanczos algorithm may not necessarily be from a codeword of a defined codebook. It is also noteworthy that it is possible to perform the so-called S-step Lanczos algorithm to obtain $\{v_1, v_2, \ldots, v_L\}$ through iterations. As such, the $\{v_1, v_2, \ldots, v_L\}$ obtained through iterations may be increasingly better aligned with the eigen subspace for the top L eigenvalues of R. By utilizing the S-step Lanczos algorithm, a more-capable UE (e.g., a UE with sufficient processing/computational resources) may obtain $\{v_1, v_2, \ldots, v_L\}$, the span of which may be close to the eigen subspace for the top L eigenvalues of R. On the other hand, a less-capable UE (e.g., a UE with less processing/computational resources) may obtain $\{v_1, v_2, \ldots, v_L\}$ from a single (or first) iteration.

Thus, under the proposed scheme, each UE may determine the feedback content for $\{v_1, v_2, \ldots, v_L\}$ according to its processing/computational capability. As different approximations to the top L eigenspace may lead to different approximation errors between R and a reconstructed version of R, it is imperative for the UE to inform the network the approximation error, which may be captured by $\sigma^2$ for example. Moreover, under the proposed scheme, a UE may feed back channel information to the network so that an approximation to the covariance matrix with a unitary basis may be obtained. Additionally, under the proposed scheme, it is not required for the UE to perform a full eigen decomposition of R.

Illustrative Implementations

Figure 1:
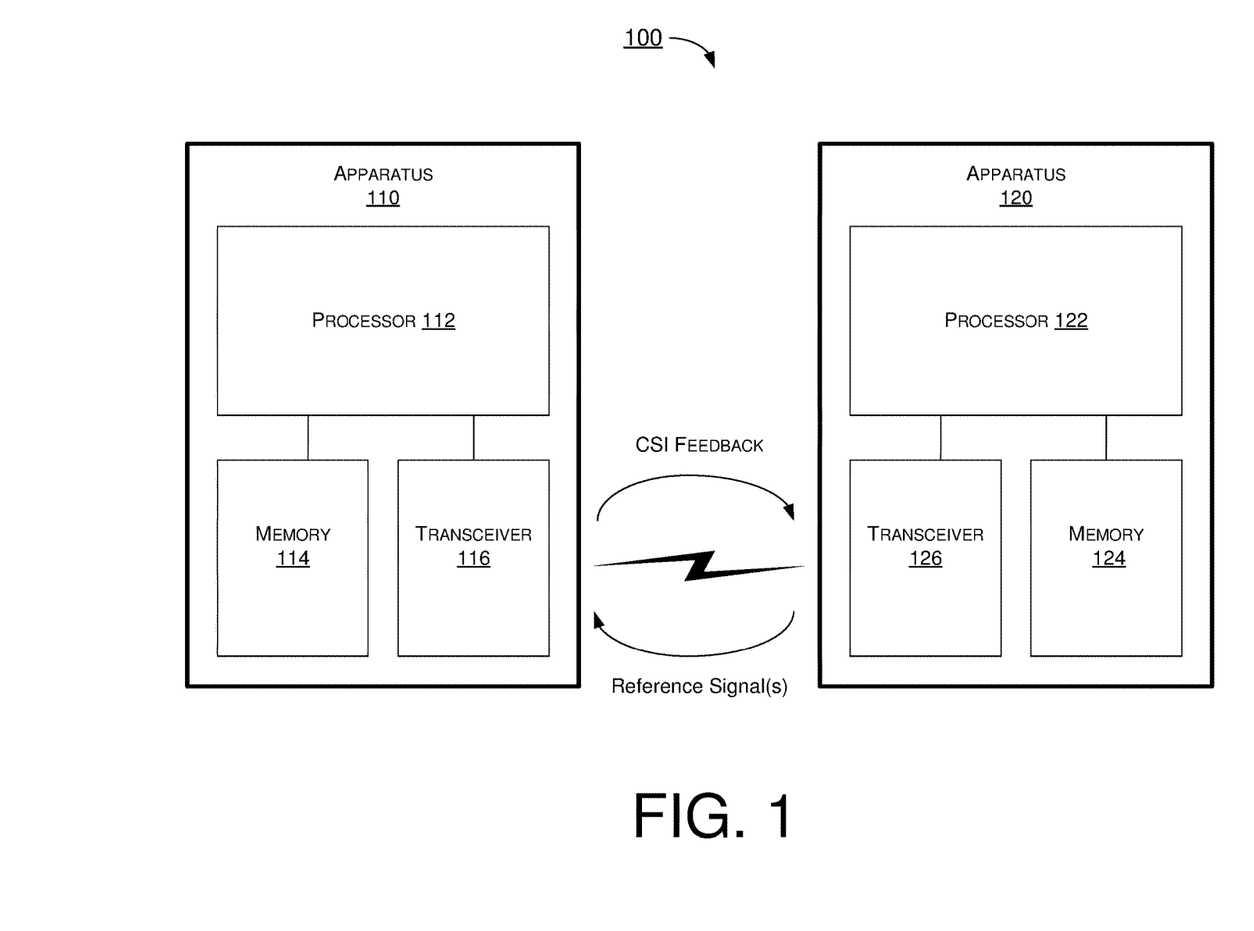
FIG. 1 is a block diagram of an example system in accordance with an implementation of the present disclosure.

FIG. 1 illustrates an example system 100 having at least an example apparatus 110 and an example apparatus 120 in accordance with an implementation of the present disclosure. Each of apparatus 110 and apparatus 120 may perform various functions to implement schemes, techniques, processes and methods described herein pertaining to overhead reduction for linear combination codebook and feedback mechanism in mobile communications, including the various schemes described above with respect to various proposed designs, concepts, schemes, systems and methods described above as well as processes 200 and 300 described below.

Each of apparatus 110 and apparatus 120 may be a part of an electronic apparatus, which may be a network apparatus or a UE, such as a portable or mobile apparatus, a wearable apparatus, a wireless communication apparatus or a computing apparatus. For instance, each of apparatus 110 and apparatus 120 may be implemented in a smartphone, a smartwatch, a personal digital assistant, a digital camera, or a computing equipment such as a tablet computer, a laptop computer or a notebook computer. Each of apparatus 110 and apparatus 120 may also be a part of a machine type apparatus, which may be an IoT apparatus such as an immobile or a stationary apparatus, a home apparatus, a wire communication apparatus or a computing apparatus. For instance, each of apparatus 110 and apparatus 120 may be implemented in a smart thermostat, a smart fridge, a smart door lock, a wireless speaker or a home control center. When implemented in or as a network apparatus, apparatus 110 and/or apparatus 120 may be implemented in an eNodeB in an LTE, LTE-Advanced or LTE-Advanced Pro network or in a gNB or TRP in a 5G network, an NR network or an IoT network.

In some implementations, each of apparatus 110 and apparatus 120 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 110 and apparatus 120 may be implemented in or as a network apparatus or a UE. Each of apparatus 110 and apparatus 120 may include at least some of those components shown in FIG. 1 such as a processor 112 and a processor 122, respectively, for example. Each of apparatus 110 and apparatus 120 may further include one or more other components not pertinent to the proposed scheme of the present disclosure (e.g., internal power supply, display device and/or user interface device), and, thus, such component(s) of apparatus 110 and apparatus 120 are neither shown in FIG. 1 nor described below in the interest of simplicity and brevity.

In one aspect, each of processor 112 and processor 122 may be implemented in the form of one or more single-core processors, one or more multi-core processors, or one or more CISC processors. That is, even though a singular term "a processor" is used herein to refer to processor 112 and processor 122, each of processor 112 and processor 122 may include multiple processors in some implementations and a single processor in other implementations in accordance with the present disclosure. In another aspect, each of processor 112 and processor 122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 112 and processor 122 is a special-purpose machine specifically designed, arranged and configured to perform specific tasks including those pertaining to overhead reduction for linear combination codebook and feedback mechanism in mobile communications in accordance with various implementations of the present disclosure.

In some implementations, apparatus 110 may also include a transceiver 116 coupled to processor 112. Transceiver 116 may be capable of wirelessly transmitting and receiving data. In some implementations, apparatus 120 may also include a transceiver 126 coupled to processor 122. Transceiver 126 may include a transceiver capable of wirelessly transmitting and receiving data.

In some implementations, apparatus 110 may further include a memory 114 coupled to processor 112 and capable of being accessed by processor 112 and storing data therein. In some implementations, apparatus 120 may further include a memory 124 coupled to processor 122 and capable of being accessed by processor 122 and storing data therein. Each of memory 114 and memory 124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 114 and memory 124 may include a type of read-only memory (ROM) such as mask ROM, programmable ROM (PROM), erasable programmable ROM (EPROM) and/or electrically erasable programmable ROM (EEPROM). Alternatively, or additionally, each of memory 114 and memory 124 may include a type of non-volatile random-access memory (NVRAM) such as flash memory, solid-state memory, ferroelectric RAM (Fe-RAM), magnetoresistive RAM (MRAM) and/or phase-change memory.

For illustrative purposes and without limitation, a description of capabilities of apparatus 110, as a UE, and apparatus 120, as a base station, is provided below.

In some implementations, processor 112 of apparatus 110, as a UE, may receive, via transceiver 116, from apparatus 120, as a base station of a NR network, one or more reference signals via a communication link between apparatus 110 and apparatus 120. Additionally, processor 112 may construct a channel state information (CSI) feedback by utilizing a correlation of channel responses in a frequency domain to reduce feedback overhead. Moreover, processor 112 may transmit to apparatus 120, via transceiver 116, the CSI feedback.

In some implementations, in constructing the CSI feedback by utilizing the correlation of the channel responses in the frequency domain, processor 112 may determine a linear combination feedback that includes one or more linear combination coefficients as functions of frequency over a plurality of frequency bands. In such cases, the CSI feedback may include the linear combination feedback.

In some implementations, the linear combination feedback may indicate a difference of the one or more linear combination coefficients between adjacent frequency bands of the plurality of frequency bands.

In some implementations, in determining the linear combination feedback, processor 112 may interpolate the one or more linear combination coefficients between adjacent frequency bands of the plurality of frequency bands. Moreover, each of an amplitude and a phase of each of the one or more linear combination coefficients may be a continuous function of frequency.

In some implementations, in interpolating the one or more linear combination coefficients, processor 112 may interpolate an amplitude but not a phase of each of the one or more linear combination coefficients in the plurality of frequency bands.

In some implementations, in interpolating the one or more linear combination coefficients, processor 112 may interpolate a phase of each of the one or more linear combination coefficients in the plurality of frequency bands.

In some implementations, in interpolating the one or more linear combination coefficients, processor 112 may interpolate a co-phasing term of the one or more linear combination coefficients in an angular domain.

In some implementations, in determining the linear combination feedback, processor 112 may determine an amplitude difference or a phase difference between two adjacent frequency bands of the plurality of frequency bands. Moreover, processor 112 may quantize the difference. In such cases, the CSI feedback may include a result of the quantizing.

In some implementations, in determining the amplitude difference or the phase difference between two adjacent frequency bands of the plurality of frequency bands, processor 112 may determine the amplitude difference between the two adjacent frequency bands. In some implementations, the result of the quantizing may include a two-bit value indicating the amplitude difference to be 0, +1, −1 or +2.

In some implementations, in receiving the one or more reference signals, processor 112 may receive the one or more reference signals from the base station. In some implementations, in constructing the CSI feedback by utilizing the correlation of the channel responses in the frequency domain, processor 112 may determine a channel covariance matrix and an approximation of the channel covariance matrix with a unitary basis.

In some implementations, in determining the channel covariance matrix, processor 112 may measure a plurality of subband channel covariance matrices each for a respective subband of a plurality of subbands. Moreover, processor 112 may determine a wideband channel covariance matrix by aggregating the plurality of subband channel covariance matrices.

In some implementations, in determining the approximation of the channel covariance matrix, processor 112 may determine the approximation of the channel covariance matrix for each subband of a plurality of subbands in the frequency domain without performing a full eigen decomposition on the channel covariance matrix.

In some implementations, in determining the approximation of the channel covariance matrix, processor 112 may perform a Cholesky decomposition of the channel covariance matrix.

In some implementations, in determining the approximation of the channel covariance matrix, processor 112 may determine at least one of the following: (a) a low-rank matrix, (b) a tri-diagonal Hermitian matrix for each subband of a plurality of subbands in the frequency domain, and (c) an approximation error which accounts for interference and noise levels for each subband of the plurality of subbands in the frequency domain. In some implementations, the CSI feedback may include the low-rank matrix, the tri-diagonal Hermitian matrix for each subband and the approximation error for each subband. It is noteworthy that it may be also possible to feed back a noise level for all subbands. Thus, in some implementations, the CSI feedback may also include a noise level for each subband of the plurality of subbands.

In some implementations, in determining the low-rank matrix, processor 112 may perform eigen decomposition on the channel covariance matrix to obtain eigenvectors to form the low-rank matrix. Moreover, in determining the tri-diagonal Hermitian matrix, processor 112 may approximate the tri-diagonal Hermitian matrix using a polynomial basis and a second-order polynomial or a higher-order polynomial.

In some implementations, in determining of low-rank matrix, processor 112 may identify a first vector or matrix by a pre-defined rule. Additionally, processor 112 may generate the low-rank matrix by applying a scalar Lanczos algorithm or a block Lanczos algorithm on the channel covariance matrix and the first vector or matrix.

In some implementations, the first vector or matrix in the scalar Lanczos algorithm or the block Lanczos algorithm may be from a codeword of a defined codebook.

In some implementations, processor 122 of apparatus 120, as a base station, may transmit, via transceiver 126, to apparatus 110, as a UE, one or more reference signals via a communication link between apparatus 110 and apparatus 120. Moreover, processor 122 may receive from apparatus 110, via transceiver 126, a CSI feedback which is constructed by utilizing a correlation of channel responses in a frequency domain. The correlation may involve a determination (e.g., by apparatus 110) of a channel covariance matrix and a determination (e.g., by apparatus 110) of an approximation of the channel covariance matrix with a unitary basis.

In some implementations, the CSI feedback may include a linear combination feedback that includes one or more linear combination coefficients as functions of frequency over a plurality of frequency bands. In some implementations, the CSI feedback may include the linear combination feedback. In some implementations, the linear combination feedback may indicate a difference of the one or more linear combination coefficients between adjacent frequency bands of the plurality of frequency bands. In some implementations, each of an amplitude and a phase of each of the one or more linear combination coefficients may be a continuous function of frequency.

In some implementations, in receiving the CSI feedback, processor 122 may receive an approximation of a channel covariance matrix. In some implementations, the approximation of the channel covariance matrix may include a low-rank matrix, a tri-diagonal Hermitian matrix, and an approximation error which accounts for interference and noise levels for a plurality of subbands in the frequency domain.

Illustrative Processes

Figure 2:
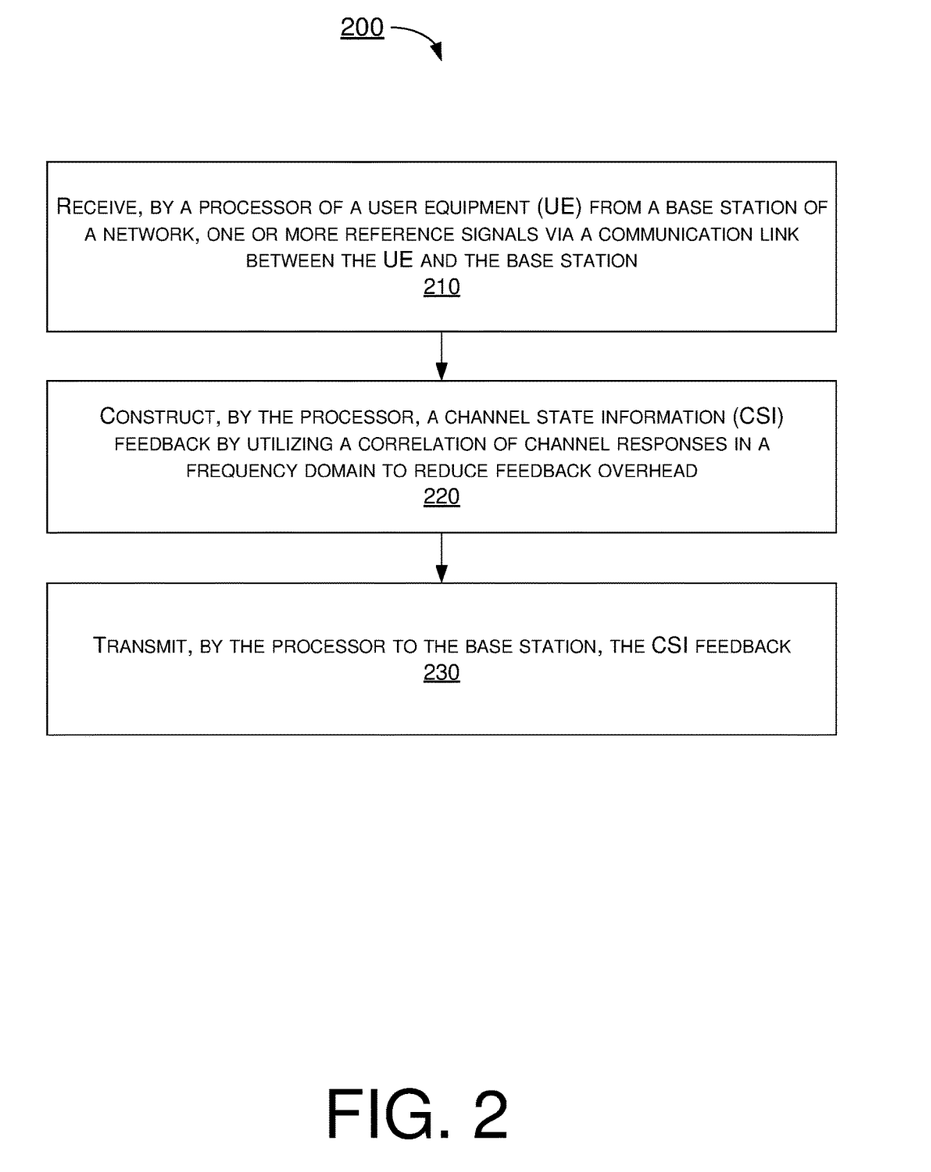
FIG. 2 is a flowchart of an example process in accordance with an implementation of the present disclosure.

FIG. 2 illustrates an example process 200 in accordance with an implementation of the present disclosure. Process 200 may represent an aspect of implementing overhead reduction for linear combination codebook and feedback mechanism in mobile communications, including the various schemes described above with respect to various proposed designs, concepts, schemes, systems and methods described above. More specifically, process 200 may represent an aspect of the proposed concepts and schemes pertaining to overhead reduction for linear combination codebook and feedback mechanism in mobile communications. Process 200 may include one or more operations, actions, or functions as illustrated by one or more of blocks 210, 220 and 230. Although illustrated as discrete blocks, various blocks of process 200 may be divided into additional blocks, combined into fewer blocks, or eliminated, depending on the desired implementation. Moreover, the blocks/sub-blocks of process 200 may be executed in the order shown in FIG. 2 or, alternatively in a different order. The blocks/sub-blocks of process 200 may be executed iteratively. Process 200 may be implemented by or in apparatus 110 and apparatus 120 as well as any variations thereof. Solely for illustrative purposes and without limiting the scope, process 200 is described below in the context of apparatus 110 as a UE and apparatus 120 as a base station. Process 200 may begin at block 210.

At 210, process 200 may involve processor 112 of apparatus 110, as a UE, receiving from apparatus 120, as a base station of a NR network, one or more reference signals via a communication link between apparatus 110 and apparatus 120. Process 200 may proceed from 210 to 220.

At 220, process 200 may involve processor 112 constructing a CSI feedback by utilizing a correlation of channel responses in a frequency domain to reduce feedback overhead. Process 200 may proceed from 220 to 230.

At 230, process 200 may involve processor 112 transmitting to apparatus 120 the CSI feedback.

In some implementations, in constructing the CSI feedback by utilizing the correlation of the channel responses in the frequency domain, process 200 may involve processor 112 determining a linear combination feedback that includes one or more linear combination coefficients as functions of frequency over a plurality of frequency bands. In such cases, the CSI feedback may include the linear combination feedback.

In some implementations, the linear combination feedback may indicate a difference of the one or more linear combination coefficients between adjacent frequency bands of the plurality of frequency bands.

In some implementations, in determining the linear combination feedback, process 200 may involve processor 112 interpolating the one or more linear combination coefficients between adjacent frequency bands of the plurality of frequency bands. Moreover, each of an amplitude and a phase of each of the one or more linear combination coefficients may be a continuous function of frequency.

In some implementations, in interpolating the one or more linear combination coefficients, process 200 may involve processor 112 interpolating an amplitude but not a phase of each of the one or more linear combination coefficients in the plurality of frequency bands.

In some implementations, in interpolating the one or more linear combination coefficients, process 200 may involve processor 112 interpolating a phase of each of the one or more linear combination coefficients in the plurality of frequency bands.

In some implementations, in interpolating the one or more linear combination coefficients, process 200 may involve processor 112 interpolating a co-phasing term of the one or more linear combination coefficients in an angular domain.

In some implementations, in determining the linear combination feedback, process 200 may involve processor 112 determining an amplitude difference or a phase difference between two adjacent frequency bands of the plurality of frequency bands. Moreover, process 200 may involve processor 112 quantizing the difference. In such cases, the CSI feedback may include a result of the quantizing.

In some implementations, in determining the amplitude difference or the phase difference between two adjacent frequency bands of the plurality of frequency bands, process 200 may involve processor 112 determining the amplitude difference between the two adjacent frequency bands. In some implementations, the result of the quantizing may include a two-bit value indicating the amplitude difference to be 0, +1, −1 or +2.

In some implementations, in receiving the one or more reference signals, process 200 may involve processor 112 receiving the one or more reference signals from the base station. In some implementations, in constructing the CSI feedback by utilizing the correlation of the channel responses in the frequency domain, process 200 may involve processor 112 determining a channel covariance matrix and an approximation of the channel covariance matrix with a unitary basis.

In some implementations, in determining the channel covariance matrix, process 200 may involve processor 112 measuring a plurality of subband channel covariance matrices each for a respective subband of a plurality of subbands. Moreover, process 200 may involve processor 112 determining a wideband channel covariance matrix by aggregating the plurality of subband channel covariance matrices.

In some implementations, in determining the approximation of the channel covariance matrix, process 200 may involve processor 112 determining the approximation of the channel covariance matrix for each subband of a plurality of subbands in the frequency domain without performing a full eigen decomposition on the channel covariance matrix.

In some implementations, in determining the approximation of the channel covariance matrix, process 200 may involve processor 112 performing a Cholesky decomposition of the channel covariance matrix.

In some implementations, in determining the approximation of the channel covariance matrix, process 200 may involve processor 112 determining at least one of the following: (a) a low-rank matrix, (b) a tri-diagonal Hermitian matrix for each subband of a plurality of subbands in the frequency domain, and (c) an approximation error which accounts for interference and noise levels for each subband of the plurality of subbands in the frequency domain. In some implementations, the CSI feedback may include the low-rank matrix, the tri-diagonal Hermitian matrix for each subband and the approximation error for each subband. In some implementations, the CSI feedback may also include a noise level for each subband of the plurality of subbands.

In some implementations, in determining the low-rank matrix, process 200 may involve processor 112 performing eigen decomposition on the channel covariance matrix to obtain eigenvectors to form the low-rank matrix. Moreover, in determining the tri-diagonal Hermitian matrix, process 200 may involve processor 112 approximating the tri-diagonal Hermitian matrix using a polynomial basis and a second-order polynomial or a higher-order polynomial.

In some implementations, in determining of low-rank matrix, process 200 may involve processor 112 identifying a first vector or matrix from a pre-defined rule. Additionally, process 200 may involve processor 112 generating the low-rank matrix by applying a scalar Lanczos algorithm or a block Lanczos algorithm on the channel covariance matrix and the first vector or matrix.

In some implementations, the first vector or matrix in the scalar Lanczos algorithm or the block Lanczos algorithm may be from a codeword of a defined codebook.

Figure 3:
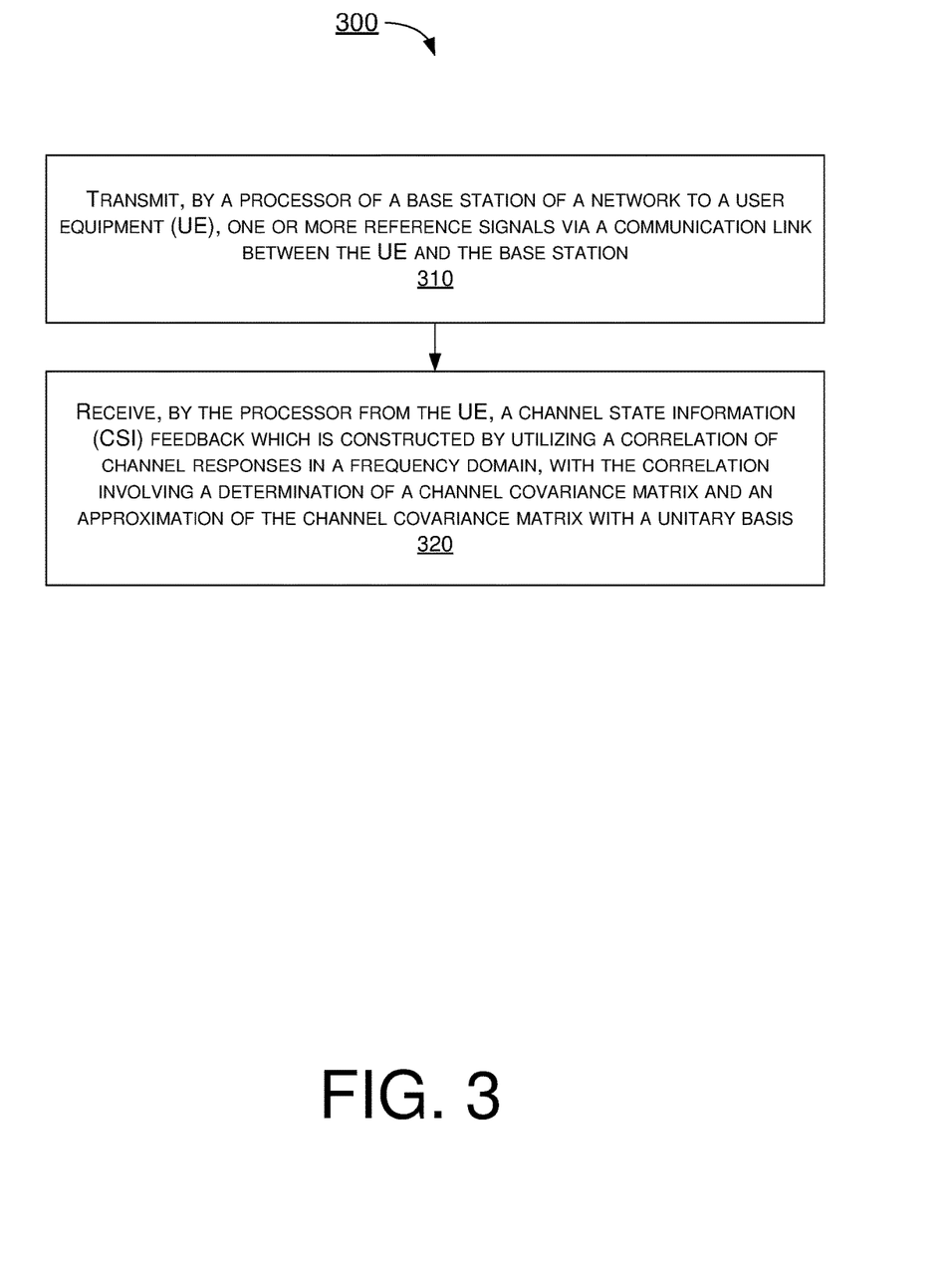
FIG. 3 is a flowchart of an example process in accordance with an implementation of the present disclosure.

FIG. 3 illustrates an example process 300 in accordance with an implementation of the present disclosure. Process 300 may represent an aspect of implementing overhead reduction for linear combination codebook and feedback mechanism in mobile communications, including the various schemes described above with respect to various proposed designs, concepts, schemes, systems and methods described above. More specifically, process 300 may represent an aspect of the proposed concepts and schemes pertaining to overhead reduction for linear combination codebook and feedback mechanism in mobile communications. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. The blocks/sub-blocks of process 300 may be executed iteratively. Process 300 may be implemented by or in apparatus 110 and apparatus 120 as well as any variations thereof. Solely for illustrative purposes and without limiting the scope, process 300 is described below in the context of apparatus 110 as a UE and apparatus 120 as a base station. Process 300 may begin at block 310.

At 310, process 300 may involve processor 122 of apparatus 120, as a base station, transmitting to apparatus 110, as a UE, one or more reference signals via a communication link between apparatus 110 and apparatus 120. Process 300 may proceed from 310 to 320.

At 320, process 300 may involve processor 122 receiving from apparatus 110 a CSI feedback which is constructed by utilizing a correlation of channel responses in a frequency domain, with the correlation involving a determination of a channel covariance matrix and a determination of an approximation of the channel covariance matrix with a unitary basis.

In some implementations, the CSI feedback may include a linear combination feedback that includes one or more linear combination coefficients as functions of frequency over a plurality of frequency bands. In some implementations, the CSI feedback may include the linear combination feedback. In some implementations, the linear combination feedback may indicate a difference of the one or more linear combination coefficients between adjacent frequency bands of the plurality of frequency bands. In some implementations, each of an amplitude and a phase of each of the one or more linear combination coefficients may be a continuous function of frequency.

In some implementations, in receiving the CSI feedback, process 300 may involve processor 122 receiving an approximation of a channel covariance matrix. In some implementations, the approximation of the channel covariance matrix may include a low-rank matrix, a tri-diagonal Hermitian matrix, and an approximation error which accounts for interference and noise levels for a plurality of subbands in the frequency domain.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of a user equipment (UE) from a base station of a network, one or more reference signals via a communication link between the UE and the base station;
constructing, by the processor, a channel state information (CSI) feedback by utilizing a correlation of channel responses in a frequency domain to reduce feedback overhead; and
transmitting, by the processor to the base station, the CSI feedback,
wherein the constructing of the CSI feedback by utilizing the correlation of the channel responses in the frequency domain comprises determining a linear combination feedback comprising one or more linear combination coefficients as functions of frequency over a plurality of frequency bands,
wherein the CSI feedback comprises the linear combination feedback, and wherein the determining of the linear combination feedback comprises interpolating the one or more linear combination coefficients between adjacent frequency bands of the plurality of frequency bands.

2. The method of claim 1, wherein the linear combination feedback indicates a difference of the one or more linear combination coefficients between adjacent frequency bands of the plurality of frequency bands.

3. The method of claim 1, wherein each of an amplitude and a phase of each of the one or more linear combination coefficients is a continuous function of frequency.

4. The method of claim 3, wherein the interpolating of the one or more linear combination coefficients comprises interpolating an amplitude but not a phase of each of the one or more linear combination coefficients in the plurality of frequency bands.

5. The method of claim 3, wherein the interpolating of the one or more linear combination coefficients comprises interpolating a phase of each of the one or more linear combination coefficients in the plurality of frequency bands.

6. The method of claim 3, wherein the interpolating of the one or more linear combination coefficients comprises interpolating a co-phasing term of the one or more linear combination coefficients in an angular domain.

7. The method of claim 1, wherein the determining of the linear combination feedback comprises:
determining an amplitude difference or a phase difference between two adjacent frequency bands of the plurality of frequency bands; and
quantizing the difference,
and wherein the CSI feedback comprises a result of the quantizing.

8. The method of claim 7, wherein the determining of the amplitude difference or the phase difference between two adjacent frequency bands of the plurality of frequency bands comprises determining the amplitude difference between the two adjacent frequency bands, and wherein the result of the quantizing comprises a two-bit value indicating the amplitude difference to be 0, +1, −1 or +2.

9. The method of claim 1, wherein the receiving of the one or more reference signals comprises receiving the one or more reference signals from the base station, and wherein the constructing of the CSI feedback by utilizing the correlation of the channel responses in the frequency domain comprises:
determining a channel covariance matrix; and
determining an approximation of the channel covariance matrix with a unitary basis.

10. The method of claim 9, wherein the determining of the channel covariance matrix comprises:
measuring a plurality of subband channel covariance matrices each for a respective subband of a plurality of subbands; and
determining a wideband channel covariance matrix by aggregating the plurality of subband channel covariance matrices.

11. The method of claim 9, wherein the determining of the approximation of the channel covariance matrix comprises determining the approximation of the channel covariance matrix for each subband of a plurality of subbands in the frequency domain without performing a full eigen decomposition on the channel covariance matrix.

12. The method of claim 9, wherein the determining of the approximation of the channel covariance matrix comprises performing a Cholesky decomposition of the channel covariance matrix.

13. The method of claim 9, wherein the determining of the approximation of the channel covariance matrix comprises at least one of:
determining a low-rank matrix;
determining a tri-diagonal Hermitian matrix for each subband of a plurality of subbands in the frequency domain; and
determining an approximation error which accounts for interference and noise levels for each subband of the plurality of subbands in the frequency domain,
wherein the CSI feedback comprises the low-rank matrix, the tri-diagonal Hermitian matrix for each subband and the approximation error for each subband.

14. The method of claim 13, wherein the determining of the low-rank matrix comprises performing eigen decomposition on the channel covariance matrix to obtain eigenvectors to form the low-rank matrix, and wherein the determining of the tri-diagonal Hermitian matrix comprises approximating the tri-diagonal Hermitian matrix using a polynomial basis and a second-order polynomial or a higher-order polynomial.

15. The method of claim 13, wherein the determining of the low-rank matrix comprises:
identifying a first vector or matrix by a pre-defined rule; and
generating the low-rank matrix by applying a scalar Lanczos algorithm or a block Lanczos algorithm on the channel covariance matrix and the first vector or matrix.

16. The method of claim 15, wherein the first vector or matrix in the scalar Lanczos algorithm or the block Lanczos algorithm is from a codeword of a defined codebook.

17. A method, comprising:
transmitting, by a processor of a base station of a network to a user equipment (UE), one or more reference signals via a communication link between the UE and the base station; and
receiving, by the processor from the UE, a channel state information (CSI) feedback which is constructed by utilizing a correlation of channel responses in a frequency domain, with the correlation involving a determination of a channel covariance matrix and a determination of an approximation of the channel covariance matrix with a unitary basis,
wherein the CSI feedback comprises a linear combination feedback comprising one or more linear combination coefficients as functions of frequency over a plurality of frequency bands,
wherein the CSI feedback comprises the linear combination feedback, and
wherein the linear combination feedback indicates a difference of the one or more linear combination coefficients between adjacent frequency bands of the plurality of frequency bands.

18. The method of claim 17, wherein each of an amplitude and a phase of each of the one or more linear combination coefficients is a continuous function of frequency.

19. The method of claim 18, wherein the receiving of the CSI feedback comprises receiving the approximation of a channel covariance matrix, and wherein the approximation of the channel covariance matrix comprises a low-rank matrix, a tri-diagonal Hermitian matrix, an approximation error which accounts for interference and noise levels for a plurality of subbands in the frequency domain, and a noise level for each subband of the plurality of subbands.

* * * * *

UNITED STATES PATENT AND TRADEMARK OFFICE
CERTIFICATE OF CORRECTION

PATENT NO. : 10,298,311 B2
APPLICATION NO. : 15/969747
DATED : May 21, 2019
INVENTOR(S) : Weidong Yang et al.

Page 1 of 1

It is certified that error appears in the above-identified patent and that said Letters Patent is hereby corrected as shown below:

In the Specification

In Column 6, between Lines 30 and 35, the mathematical equation is currently shown as follows:

$$W = \underbrace{\begin{bmatrix} B & 0 \\ 0 & B \end{bmatrix}}_{W_1} \begin{bmatrix} Q_0 & 0 \\ 0 & Q_1 \end{bmatrix}$$

This mathematical equation be corrected as follows:

$$W = \underbrace{\begin{bmatrix} B & 0 \\ 0 & B \end{bmatrix}}_{W_1} \begin{bmatrix} Q_0 \\ Q_1 \end{bmatrix}$$

Signed and Sealed this
Twenty-fifth Day of June, 2019

Andrei Iancu
*Director of the United States Patent and Trademark Office*